(12) United States Patent
Kuang et al.

(10) Patent No.: US 7,203,578 B2
(45) Date of Patent: Apr. 10, 2007

(54) WHEEL TORQUE ESTIMATION IN A POWERTRAIN FOR A HYBRID ELECTRIC VEHICLE

(75) Inventors: Ming Kuang, Canton, MI (US); Bader Badreddine, Dearborn, MI (US); Mathew Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 10/710,758

(22) Filed: Jul. 30, 2004

(65) Prior Publication Data

US 2006/0021811 A1 Feb. 2, 2006

(51) Int. Cl.
*B60L 9/00* (2006.01)
*B60K 1/00* (2006.01)

(52) U.S. Cl. ........................ 701/22; 180/65.1
(58) Field of Classification Search .............. 701/22, 701/54, 84, 87, 69, 90; 180/65.1–65.8
See application file for complete search history.

(56) References Cited

U.S. PATENT DOCUMENTS

| 5,452,207 | A | 9/1995 | Hrovat et al. ............... 701/1 |
|---|---|---|---|
| 5,751,579 | A | 5/1998 | Hrovat et al. ............... 701/71 |
| 6,154,702 | A | 11/2000 | Fodor et al. ............... 701/71 |
| 6,434,466 | B1 | 8/2002 | Robichaux et al. ........... 701/54 |
| 6,600,988 | B1 | 7/2003 | Da et al. .................... 701/93 |
| 6,617,704 | B2 | 9/2003 | Tomikawa ................ 180/65.2 |
| 6,629,026 | B1 | 9/2003 | Baraszu et al. ........... 180/65.2 |
| 2003/0062206 | A1* | 4/2003 | Fujikawa .................. 180/65.2 |
| 2004/0094342 | A1* | 5/2004 | Kowatari et al. .......... 180/65.2 |
| 2005/0284679 | A1* | 12/2005 | Hommi et al. ............... 701/36 |

* cited by examiner

*Primary Examiner*—Matthew Luu
(74) *Attorney, Agent, or Firm*—David B. Kelley; Brooks & Kushman

(57) ABSTRACT

A method for estimating traction wheel torque in a hybrid electric vehicle powertrain that does not require a torque sensor. The method relies upon variables including speed, torque, moments of inertia and angular acceleration of powertrain components. Separate strategy routines are used for a parallel operating mode and for a non-parallel operating mode.

10 Claims, 3 Drawing Sheets

WHEEL TORQUE ESTIMATION IN A POWERTRAIN FOR A HYBRID ELECTRIC VEHICLE

BACKGROUND OF INVENTION

1. Field of the Invention

The invention relates to hybrid electric vehicles and a method for estimating vehicle wheel torque.

2. Background Art

Unlike pure electric vehicles that use a battery as a power source for a motor in a power flow path to traction wheels, a hybrid electric vehicle has an engine (typically an internal combustion engine) and a high voltage motor for powering the vehicle. A known powertrain configuration for a hybrid electric vehicle consists of two power sources that are connected to the vehicle traction wheels through a planetary gearset. A first power source in this powertrain configuration is a combination of an engine, a generator and a planetary gearset. A second power source comprises an electric drive system including a motor, a generator and a battery subsystem. The battery subsystem acts as an energy storing device for the generator and the motor.

In the case of the first power source, the engine speed can be decoupled from the vehicle speed since the generator acts as a torque reaction element for a reaction gear of the planetary gearset. This results in both a mechanical torque flow path and an electromechanical torque flow path, which function in tandem to deliver driving torque to the vehicle traction wheels. The generator reaction torque effects engine speed control as it provides a reaction torque in the torque flow path from the engine. This operating mode commonly is referred to as a non-parallel operating mode. If the generator is braked, the reaction element of the gearset also becomes braked, which establishes a fully mechanical power flow path from the engine to the traction wheels through the gearset. This is referred to as a parallel operating mode. An example of a powertrain configuration of this type can be seen by referring to co-pending U.S. patent application Ser. No. 10/248,886, filed Feb. 27, 2003, now U.S. Pat. No. 6,991,053, dated Jan. 31, 2006. This co-pending patent application is assigned to the assignee of the present invention.

In the powertrain configuration disclosed in the co-pending patent application, torque is delivered through the powertrain for forward motion only in the case of the first power source. In the case of the second power source, the electric motor draws electric power from the battery and provides driving torque independently of the engine in both forward and reverse drive. In this operating mode, the generator, using battery power, can drive against a one-way clutch on the engine output shaft to propel the vehicle forward.

A control system is used to effect integration of the two power sources so that they work together seamlessly to meet the driver's demand for power at the traction wheels without exceeding the limits of the battery subsystem. This is accomplished in the powertrain of the co-pending patent application by coordinating the control of the two power sources. Under normal powertrain operating conditions, a vehicle system controller interprets a driver demand for power, which may be an acceleration or deceleration demand, and then determines a wheel torque demand based on driver demand and powertrain limits. The vehicle system controller also will determine when and how much torque each power source must provide to meet the driver's demand and to achieve specified vehicle performance, such as fuel economy, emissions, driveability, etc. The vehicle system controller can control the engine operating speed for each torque demand so that an efficient operating point on the speed-torque engine characteristic curve will be established.

A control system of the type discussed in the preceding paragraphs requires a so-called drive-by-wire control system as the two power sources cooperate seamlessly to achieve optimal performance and efficiency. Such a drive-by-wire system requires a torque monitor strategy to ensure that the control system wheel torque demand and the actual powertrain torque output are within a predefined range so that unintended vehicle acceleration will be avoided.

U.S. Pat. No. 5,452,207, which is owned by the assignee of the present invention, discloses a torque estimation method based on a vehicle dynamics model, a torque converter model and an engine torque model. Estimates of torque are obtained from at least two of the models. The torque estimates are weighted according to a predefined strategy and then transferred to a controller for developing torque estimates based on the weighted individual torque estimates.

A wheel torque estimation strategy is disclosed also in U.S. Pat. No. 5,751,579, which also is owned by the assignee of the present invention. It provides an estimate of wheel torque based upon engine combustion torque. The estimated torque is proportional to engine acceleration and engine powertrain mass.

SUMMARY OF INVENTION

The control method of an embodiment of the invention will provide an estimate of the total output torque at the traction wheels for any given driving condition. The torque estimate is used to perform wheel torque monitoring. The method estimates total wheel torque for any given torque of the motor, the generator and the engine in various operating modes. These modes include a non-parallel mode and a parallel mode.

When the powertrain configuration is operating in a non-parallel mode, both the engine and the motor cooperate with the gearset to establish both a mechanical torque flow path and an electromechanical torque flow path. In a so-called parallel operating mode, the generator rotor is braked.

The method of the invention performs a torque monitoring function to ensure that the vehicle does not accelerate when acceleration is not intended. It eliminates the need for using a torque sensor for measuring total wheel torque.

The method uses multiple powertrain inputs, including motor speed, generator speed, engine speed, motor torque, generator torque, engine torque and generator brake status. After calculating engine and motor angular accelerations, the strategy will determine the operating mode. Separate subroutines are used for the non-parallel mode (both positive and negative power flow) and the parallel mode to calculate output torque of the gearset.

After the output torque of the gearset is computed in either of the separate subroutines, the strategy computes a total wheel torque estimate.

DETAILED DESCRIPTION

Figure 1:
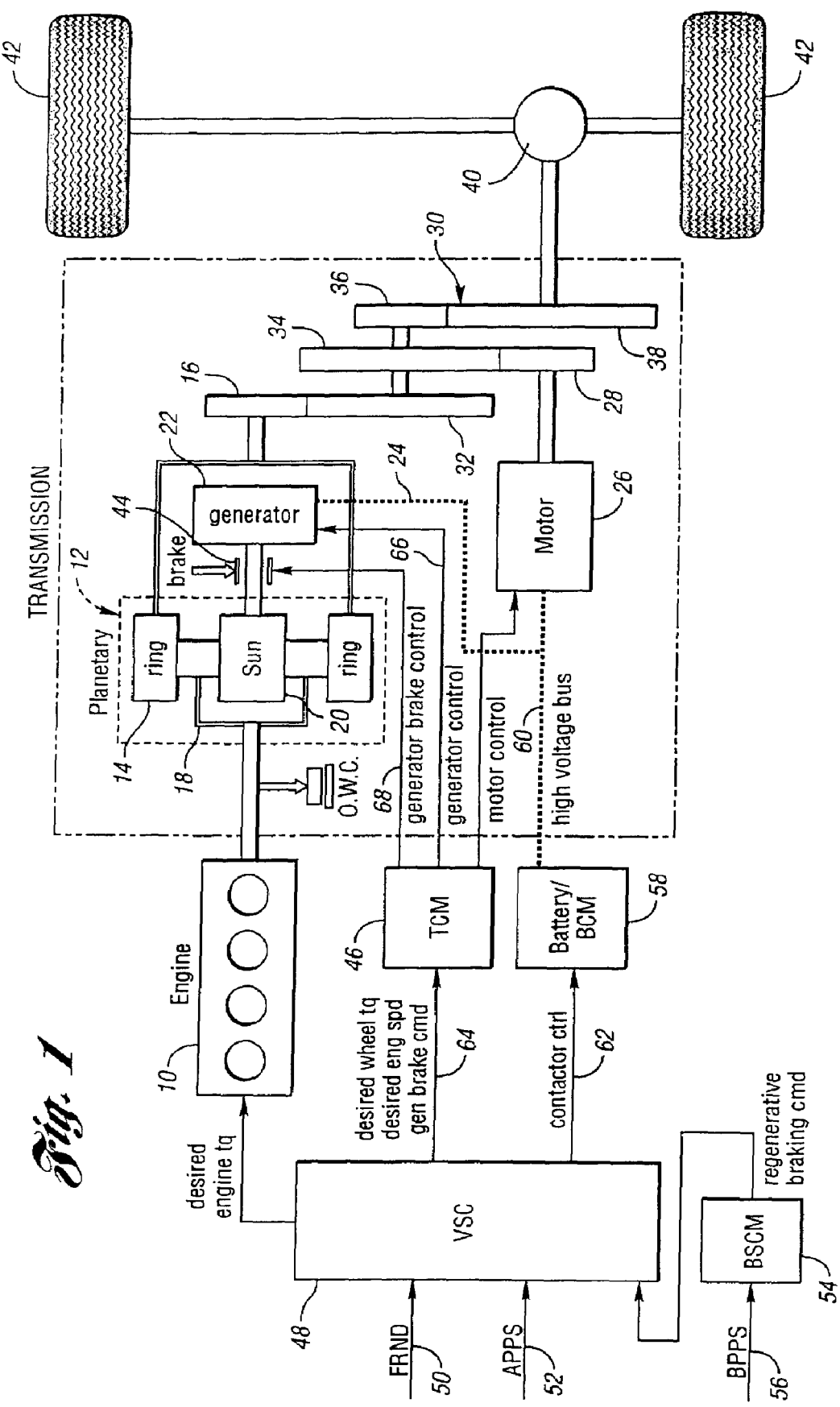
FIG. 1 is a schematic representation of a hybrid electric vehicle powertrain for an automotive vehicle capable of embodying the present invention.

The powertrain of FIG. 1 includes an internal combustion engine as shown at 10. A planetary gear unit 12 includes a ring gear 14, which is connected driveably to a torque input countershaft gear element 16. The engine torque output shaft is connected driveably to carrier 18 for the planetary gear unit 12. Sun gear 20 of the planetary gear unit 12 is connected driveably to generator 22. The generator is electrically coupled, as shown at 24, to a high voltage electric motor 26, which may be an induction motor. The output rotor of the motor is connected to gear element 28 of torque output countershaft gearing 30. A countershaft gear 32 engages gear 16. A countershaft gear of larger pitch diameter, shown at 34, driveably engages motor output drive gear element 28. A smaller pitch diameter countershaft gear element 36 driveably engages torque output gear 38, which distributes torque to a differential-and-axle assembly 40 to deliver driving torque to vehicle traction wheels 42.

A generator brake 44, when applied, anchors the rotor of generator 22, which also anchors sun gear 20. When the generator brake is applied, a mechanical torque flow path from the engine to the differential-and-axle assembly 40 is established. This is referred to as a parallel driving mode. When the brake 44 is released, reaction torque of the generator establishes torque reaction for the sun gear 20 because of the direct mechanical coupling between the sun gear and the generator rotor. Engine speed thus can be controlled by controlling generator.

The generator torque is under the control of transmission control module 46, which communicates with vehicle system controller 48. Input variables for the vehicle system controller 48 include a driver-controlled drive range selection at 50 and a signal from an accelerator pedal position sensor 52. Another driver input for the vehicle system controller is a brake pedal position sensor signal 56.

Battery 58 is connected to the generator 22 and the motor 26 through a high voltage bus 60. The battery is under the control of the vehicle system controller by means of a contactor control signal at 62.

The transmission control module receives from the vehicle system controller a desired wheel torque signal, a desired engine speed signal and a generator brake command as shown at 64. The transmission control module 46 distributes a generator control signal through signal flow path 68 that extends from the module 46 to the brake 44.

For the purpose of describing the output torque estimation method, reference will be made to the strategy flow charts of FIGS. 2 and 3. The various method steps involved in the strategy of FIGS. 2 and 3 make use of moment of inertia terms, torque ratio terms, torque terms and angular acceleration terms for elements of the powertrain. Some of these terms are as follows:

$J_{eng}$ is the combined inertia values for engine and carrier;

$J_{gen\_couple}$ is the combined moment inertia of the generator/sun gear;

$J_{mot\_eff}$ the sum of the combined motor/gear inertia and the generator inertia reflected at the motor;

$T_{gen2mot}$ is the torque ratio from generator shaft to motor shaft;

$T_{eng2mot}$ is the torque ratio from engine shaft to motor shaft; and $T_{mot2wheel}$ is the torque ratio from motor shaft to wheel.

Figure 2:
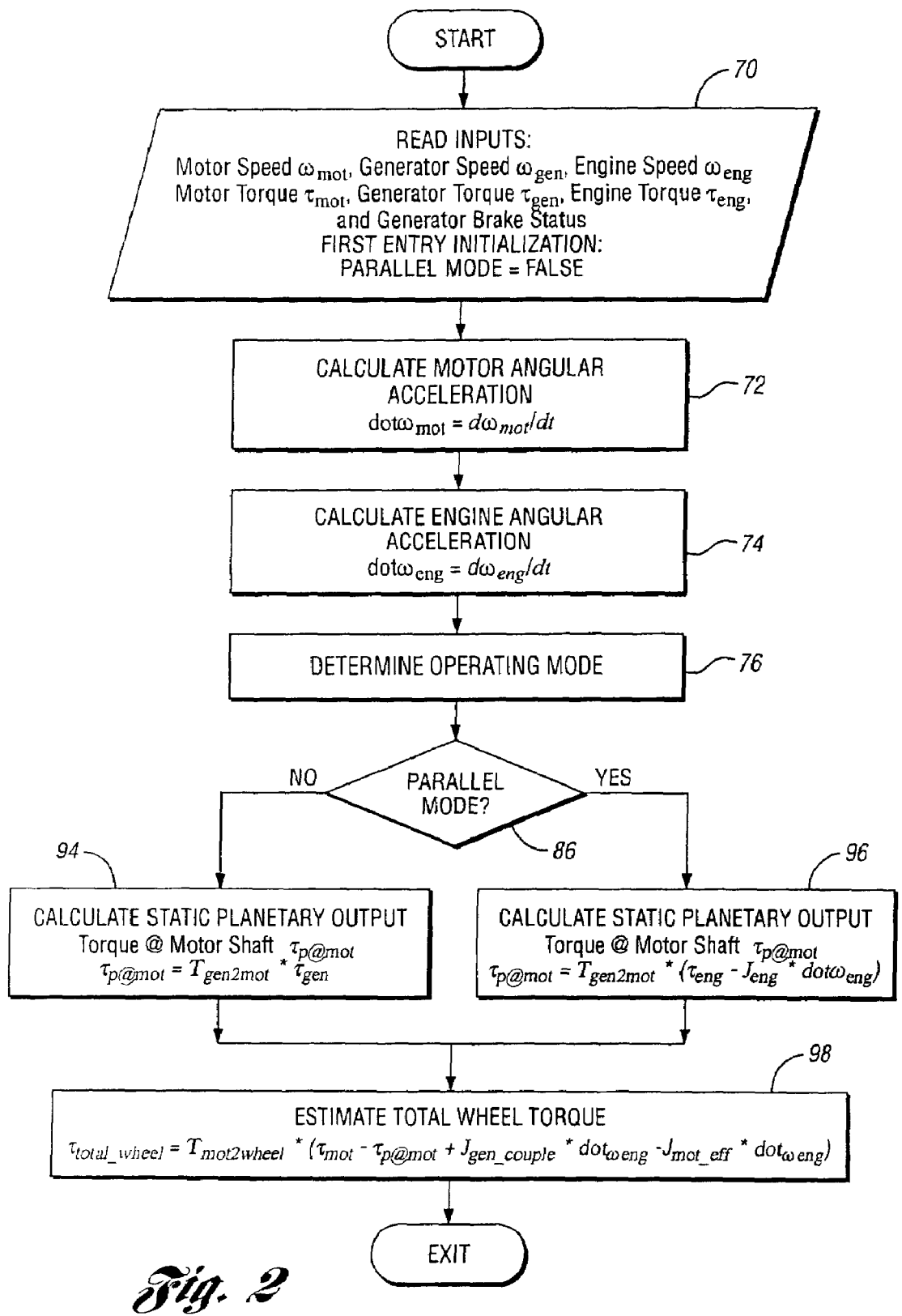
FIG. 2 is a flowchart illustrating the control software strategy for calculating an estimate of total wheel torque.

In FIG. 2, the strategy routine begins at 70, where the various inputs for the controller 48 are read and then stored in computer memory (RAM). The inputs are motor speed, $\omega_{mot}$, generator speed, $\omega_{gen}$, engine speed, $\omega_{eng}$, motor torque, $\tau_{mot}$, generator torque, $\tau_{gen}$, engine torque, $\tau_{eng}$, and generator brake status (the brake 44 is either "on" or "off"). The default operating mode is a non-parallel mode indicated by the statement "Parallel Mode=FALSE."

The first entry in the initialization step sets the parallel mode (internal variable) to FALSE. This occurs in the first entry only. As the strategy routine proceeds, the operating mode will be determined for each control loop of the processor, as will be explained subsequently.

The routine then proceeds to action block 72, where motor angular acceleration is calculated. This is done using the functional relationship: $dot\omega_{mot}=d\omega_{mot}/dt$, which is a derivative of the angular velocity of the motor rotor. The result of the calculation at action block 72 is stored in memory, and the routine then proceeds to action block 74 where the engine angular acceleration is calculated. This is done in accordance with the following relationship: $dot\omega_{eng}=d\omega_{eng}/dt$, which is the derivative of the angular engine velocity.

After the information obtained at action block 74 is stored in memory, the routine proceeds to action block 76, where the operating mode is determined. The routine at action block 76 is a subroutine indicated in FIG. 3. That subroutine will determine whether the powertrain is in the parallel mode or in the non-parallel mode. As explained previously, the generator brake is applied when the powertrain is in the parallel mode and is released to establish plural power flow paths in the non-parallel mode. As previously explained also, the default operating mode is a non-parallel mode.

The routine then will proceed to decision block 78, where the controller will determine whether the generator brake is on. If the inquiry at 78 is negative, the operating mode set during initialization is confirmed. If the inquiry at 78 is positive, the routine will proceed to decision block 80, where it is determined whether the generator speed is less than a predetermined threshold generator speed $C_{gen\_spd}$.

If the result of the inquiry at 80 is negative, the non-parallel mode determination is confirmed. If the result of the inquiry at 80 is positive, the routine then will proceed to decision block 82, where it is determined whether the generator torque is less than a predetermined threshold $C_{gen\_tq}$.

If the result of the inquiry at 82 is negative, the non-parallel mode is confirmed. If the result of the inquiry at 82 is positive, the parallel mode is set to "TRUE", which is a change in mode from non-parallel operation to parallel operation. This occurs at action block 84.

If the powertrain is in a parallel operating mode, as determined at decision block 86', the control routine will proceed to decision block 88, where it is determined whether the generator speed is less than a predetermined threshold generator speed $C_{gen\_spd}$. If the result of the inquiry at 88 is positive, the operating mode is changed at action block 90 from the parallel mode to the non-parallel mode (the setting is "FALSE").

If the result of the inquiry at 88 is negative, the routine proceeds to action block 92, where it is determined whether the generator torque is less than a predetermined threshold $C_{gen\_tq}$. If the result of the inquiry at 92 is positive, again the operating mode is changed at action block 90 from the parallel mode to the non-parallel mode. If the result of the inquiry at 92 is negative, the parallel mode at decision block 88 is confirmed. Likewise, a negative result of the inquiry at decision block 88 is a confirmation of the parallel mode indicated at 86'.

Figure 3:
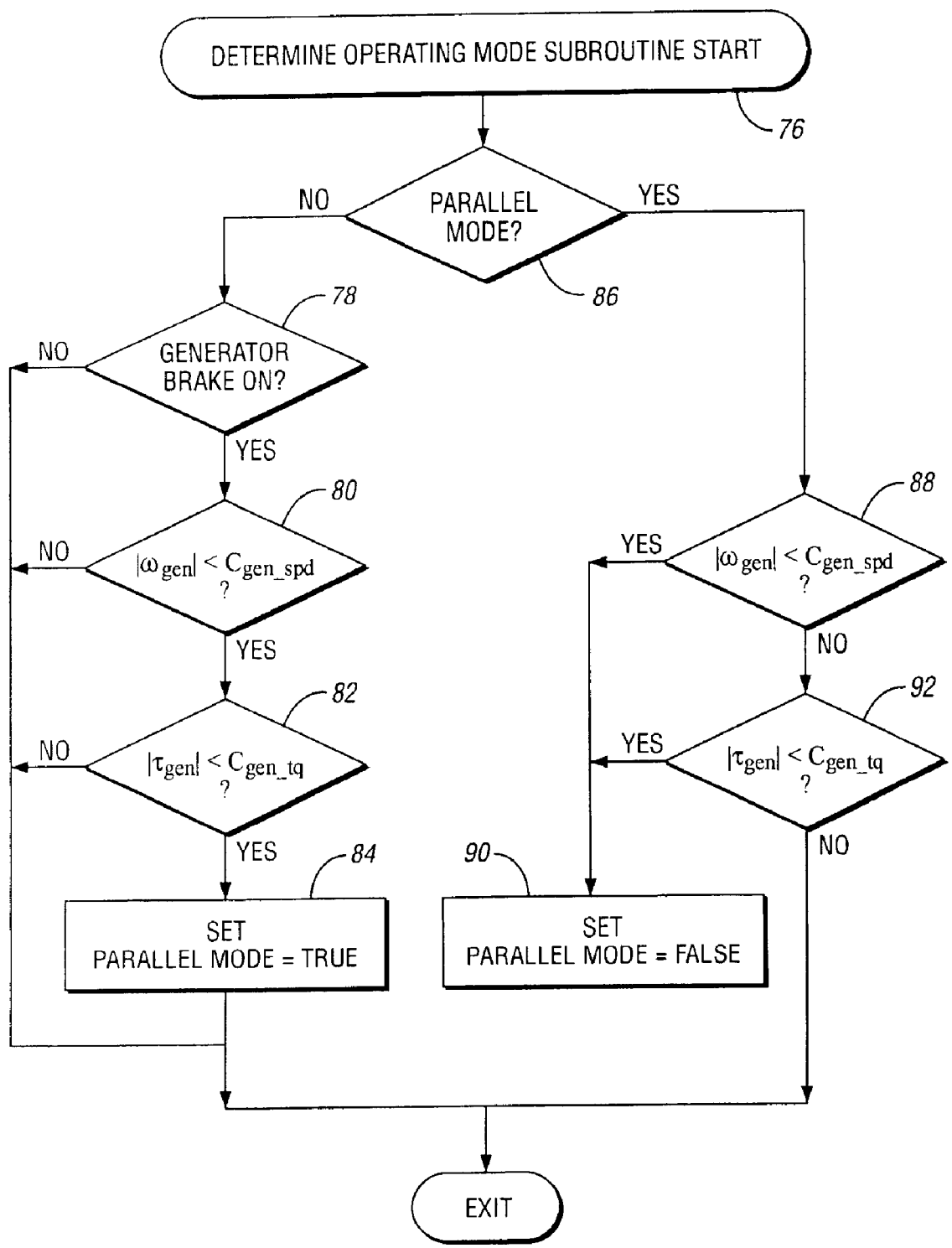
FIG. 3 is a sub-routine used in carrying out the routine of FIG. 2 wherein the operating mode for the powertrain is determined.

Based upon the operating mode that is determined in the subroutine of FIG. 3, the method uses one of two different ways to calculate planetary output torque at the motor shaft. If the powertrain is in a non-parallel operating mode as confirmed at 86 in FIG. 2, the routine of FIG. 2 will proceed to action block 94, where static planetary output torque is calculated. This is done using the relationship:

$$\tau_{p@mot} = T_{gen2mot} * \tau_{gen}$$

where:

$\tau_{p@mot}$=torque at motor shaft;
$T_{gen2mot}$=torque ratio from generator to motor shaft; and
$\tau_{gen}$=generator torque.

On the other hand, if it is determined that the powertrain is in the parallel operating mode at 86, the routine will proceed to action block 96, where static planetary output torque is computed using the relationship:

$$\tau_{p@mot} = -T_{gen2mot} * (\tau_{eng} - J_{eng} * dot\omega_{eng})$$

where:

$\tau_{p@mot}$=torque at motor shaft;
$T_{gen2mot}$=torque ratio from engine to motor shaft;
$\tau_{eng}$=engine torque;
$J_{eng}$=lumped moment of inertia of engine and the element of the gearing to which it is connection; and
$dot\omega_{eng}$=engine angular acceleration.

Following either of the calculations at action blocks 94 and 96, the routine will proceed to action block 98 where the total wheel torque is estimated. This is done using the following relationship:

$$\tau_{total\_wheel} = T_{mot2wheel} * (\tau_{mot} - \tau_{p@mot} + J_{gen\_couple} * dot\omega_{eng} - J_{mot\_eff} * dot\omega_{eng})$$

where:

$\tau_{total\_wheel}$=total wheel torque estimate;
$T_{mot2wheel}$=torque ratio from motor to wheels;
$\tau_{mot}$=torque @ motor shaft;
$J_{gen\_couple}$=coupled moment of inertia of generator and the element to which it is connected;
$dot\omega_{eng}$=engine angular acceleration; and
$J_{moteff}$=sum of the lumped motor and gearing inertia and the lumped generator inertia reflect at the motor.

Although an embodiment of the invention has been described, it will be apparent to a person skilled in the art that modifications may be made to the invention without departing from the scope of the invention. All such modifications and equivalents thereof are intended to be covered by the following claims.

The invention claimed is:

1. A method for determining driving wheel torque for a vehicle having a hybrid electric powertrain, the powertrain comprising an engine, an electric motor, a battery, a generator and gearing that define plural torgue flow paths from the engine and the motor to a torque output shaft, the powertrain having a parallel operating mode in which the engine and the motor together solely define a power source and a non-parallel operating mode in which the engine, the generator and the motor solely define a power source, and a powertrain controller for controlling power distribution to vehicle traction wheels; the method comprising:

measuring values for motor speed, generator speed, engine speed, motor torque, generator torque, engine torque and storing these values in the controller;

calculating an angular acceleration for the motor;

calculating an annular acceleration for the engine;

determining whether the powertrain is operating in the parallel operating mode or in the non-parallel operating mode;

calculating a combined moment of inertia for the motor and a gearing element to which it is connected;

calculating a combined moment of inertia for the generator and a gearing, element to which it is connected;

calculating a combined moment of inertia for the engine and a gearing element to which it is connected;

calculating torque ratio of gearing between the generator and the motor;

calculating torque ratio of gearing between the engine and the motor;

calculating torque ratio of gearing between the motor and vehicle traction wheels;

calculating static gearing output torque at the motor when the powertrain is in the parallel operating mode as a function of torque ratio of gearing between the engine and the motor, engine torque, the combined moment of inertia of the engine and a gearing element to which it is connected, and angular acceleration of the engine;

calculating static gearing output torque at the motor when the powertrain is in a non-parallel operating mode as a function of torque ratio of gearing between the generator and the motor and generator torque; and estimating total wheel torque as a function of torque ratio of gearing between the motor and the traction wheels, torque of the motor, static gearing output torque, combined moment of inertia of the generator and a gearing element to which it is connected, angular acceleration of the engine, the sum of the combined moment of inertia of the motor and a gearing element to which it is connected and the combined moment of inertia of the generator and a gearing element to which it is connected and engine angular acceleration;

whereby total output torque at the traction wheels for given operating conditions is estimated to permit control of traction wheel torque and ensure that actual powertrain output torque corresponds to a torque command by the controller.

2. The method set forth in claim 1 wherein estimated total wheel torque is computed in accordance with the equation:

$$\tau_{total\_wheel} = T_{mot2wheel} * (\tau_{mot} - \tau_{p@mot} + J_{gen\_couple} * dot\omega_{eng} - J_{mot\_eff} * dot\omega_{eng})$$

where:

$\tau_{total\_wheel}$=total wheel torque estimate;
$T_{mot2wheel}$=torque ratio from motor to wheels;
$\tau_{p@mot}$=torque @ motor shaft;
$J_{gen\_couple}$=combined moment of inertia of generator and the gear element to which it is connected;
$dot\omega_{eng}$=engine angular acceleration;
$J_{mot\_eff}$=sum of the motor and gearing inertia and the generator inertia reflected at the motor; and
$\tau_{mot}$=motor torque.

3. The method set forth in claim 1 wherein static gearing output torque is computed during operation in the non-parallel mode in accordance with the equation:

$$\tau_{p@mot} = T_{gen2mot} * \tau_{gen}$$

where $\tau_{p@mot}$=torque at motor shaft;
$T_{gen2mot}$=torque ratio from generation to motor shaft; and
$\tau_{gen}$=generator torque.

4. The method set forth in claim 1 wherein static gearing output torque is computed during operation of the powertrain in the parallel operating mode in accordance with the equation:

$$\tau_{p@mot} = -T_{eng2mot}*(\tau_{eng} - J_{eng}*\mathrm{dot}\omega_{eng})$$

where:
- $\tau_{p@mot}$ = torque at motor shaft;
- $T_{eng2mot}$ = torque ratio from engine to motor shaft;
- $\tau_{eng}$ = engine torque;
- $J_{eng}$ = lumped moment of inertia of engine and the element of the gearing to which it is connected; and
- $\mathrm{dot}\omega_{eng}$ = engine angular acceleration.

5. The method set forth in claim 1 wherein the step of determining whether the powertrain is operating in the parallel operating mode or in the non-parallel operating mode comprises:
- verifying that the generator speed is less than a predetermined threshold speed value and that the generator torque is less than a predetermined threshold torque value; and
- conditioning the controller for the non-parallel operating mode if the generator speed is less than a predetermined threshold speed value and the generator torque is less than a predetermined threshold torque value.

6. The method set forth in claim 1 wherein the step of determining whether the powertrain is operating in the parallel operating mode or in the non-parallel operating mode comprises:
- verifying that the generator speed is greater than or equal to a predetermined threshold speed value and that the generator torque is greater than or equal to a predetermined threshold torque value; and
- conditioning the controller for the parallel operating mode if the generator speed is greater than or equal to a predetermined threshold speed value and the generator torque is greater than or equal to a threshold torque value.

7. A method for determining driving wheel torque for a vehicle having a hybrid electric powertrain, the powertrain comprising an engine, an electric motor, a battery, a generator and gearing that define plural torque flow paths from the engine and the motor to a torque output shaft, the powertrain having a parallel operating mode in which the engine and the motor together solely define a power source and a non-parallel operating mode in which the engine, the generator and the motor solely define a power source, and a powertrain controller for controlling power distribution to vehicle traction wheels; the method comprising:
- measuring values for motor speed, generator speed, engine speed, motor torque, generator torque, engine torque and storing these values in the controller;
- calculating an angular acceleration for the motor;
- calculating an angular acceleration for the engine;
- determining whether the powertrain is operating in the parallel operating mode or in the non-parallel operating mode;
- calculating a combined moment of inertia for the motor and a gearing element to which it is connected;
- calculating a combined moment of inertia for the generator and a gearing element to which it is connected;
- calculating a combined moment of inertia for the engine and a gearing element to which it is connected;
- calculating torque ratio of gearing between the generator and the motor;
- calculating torque ratio of gearing between the engine and the motor;
- calculating torque ratio of gearing between the motor and vehicle traction wheels;
- calculating static gearing output torque at the motor when the powertrain is in a non-parallel operating mode as a function of torque ratio of gearing between the generator and the motor and generator torque; and
- estimating total wheel torque as a function of torque ratio of gearing between the motor and the traction wheels, torque of the motor, static gearing output torque, combined moment of inertia of the generator and a gearing element to which it is connected, angular acceleration of the engine, the sum of the combined moment of inertia of the motor and a gearing element to which it is connected and the combined moment of inertia of the generator and a gearing element to which it is connected and engine angular acceleration;
- whereby total output torque at the traction wheels for given operating conditions is estimated to permit control of traction wheel torque and ensure that actual powertrain output torque corresponds to a torque command by the controller.

8. A method for determining driving wheel torque for a vehicle having a hybrid electric powertrain, the powertrain comprising an engine, an electric motor, a battery, a generator and gearing that define plural torque flow paths from the engine and the motor to a torque output shaft, the powertrain having a parallel operating mode in which the engine and the motor together solely define a power source and a non-parallel operating mode in which the engine, the generator and the motor solely define a power source, and a powertrain controller for controlling power distribution to vehicle traction wheels; the method comprising:
- measuring values for motor speed, generator speed, engine speed, motor torque, generator torque, engine torque and storing these values in the controller;
- calculating an angular acceleration for the motor;
- calculating an angular acceleration for the engine;
- determining whether the powertrain is operating in the parallel operating mode or in the non-parallel operating mode;
- calculating a combined moment of inertia for the motor and a gearing element to which it is connected;
- calculating a combined moment of inertia for the generator and a gearing element to which it is connected;
- calculating a combined moment of inertia for the engine and a gearing element to which it is connected;
- calculating torque ratio of gearing between the generator and the motor;
- calculating torque ratio of gearing between the engine and the motor;
- calculating torque ratio of gearing between the motor and vehicle traction wheels;
- calculating static gearing output torque at the motor when the powertrain is in the parallel operating mode as a function of torque ratio of gearing between the engine and the motor, engine torque, the combined moment of inertia of the engine and a gearing element to which it is connected, and angular acceleration of the engine;
- estimating total wheel torque as a function of torque ratio of gearing between the motor and the traction wheels, torque of the motor, static gearing output torque, combined moment of inertia of the generator and a gearing element to which it is connected, angular acceleration of the engine, the sum of the combined moment of inertia of the motor and a gearing element to which it is connected and the combined moment of inertia of the generator and a gearing element to which it is connected and engine angular acceleration;

whereby total output torque at the traction wheels for given operating conditions is estimated to permit control of traction wheel torque and ensure that actual powertrain output torque corresponds to a torque command by the controller.

9. The method set forth in claim 7 wherein static gearing output torque is computed in accordance with the equation:

$$\tau_{p@mot} = T_{gen2mot} * \tau_{gen}$$

where:

$\tau_{p@mot}$=torque at motor shaft;
$T_{gen2mot}$=torque ratio from generator to motor shaft; and
$\tau_{gen}$=generator torque.

10. The method set forth in claim 8 wherein static gearing output torque is computed in accordance with the equation:

$$\tau_{p@mot} = -T_{eng2mot} * (\tau_{eng} - J_{eng} * dot\omega_{eng})$$

where:

$\tau_{p@mot}$=torque at motor shaft;
$T_{eng2mot}$=torque ratio from engine to motor shaft;
$\tau_{eng}$=engine torque;
$J_{eng}$=combined moment of inertia of engine and the element of the gearing to which it is connected; and
$dot\omega_{eng}$=engine angular acceleration.

* * * * *